Patented Oct. 11, 1932

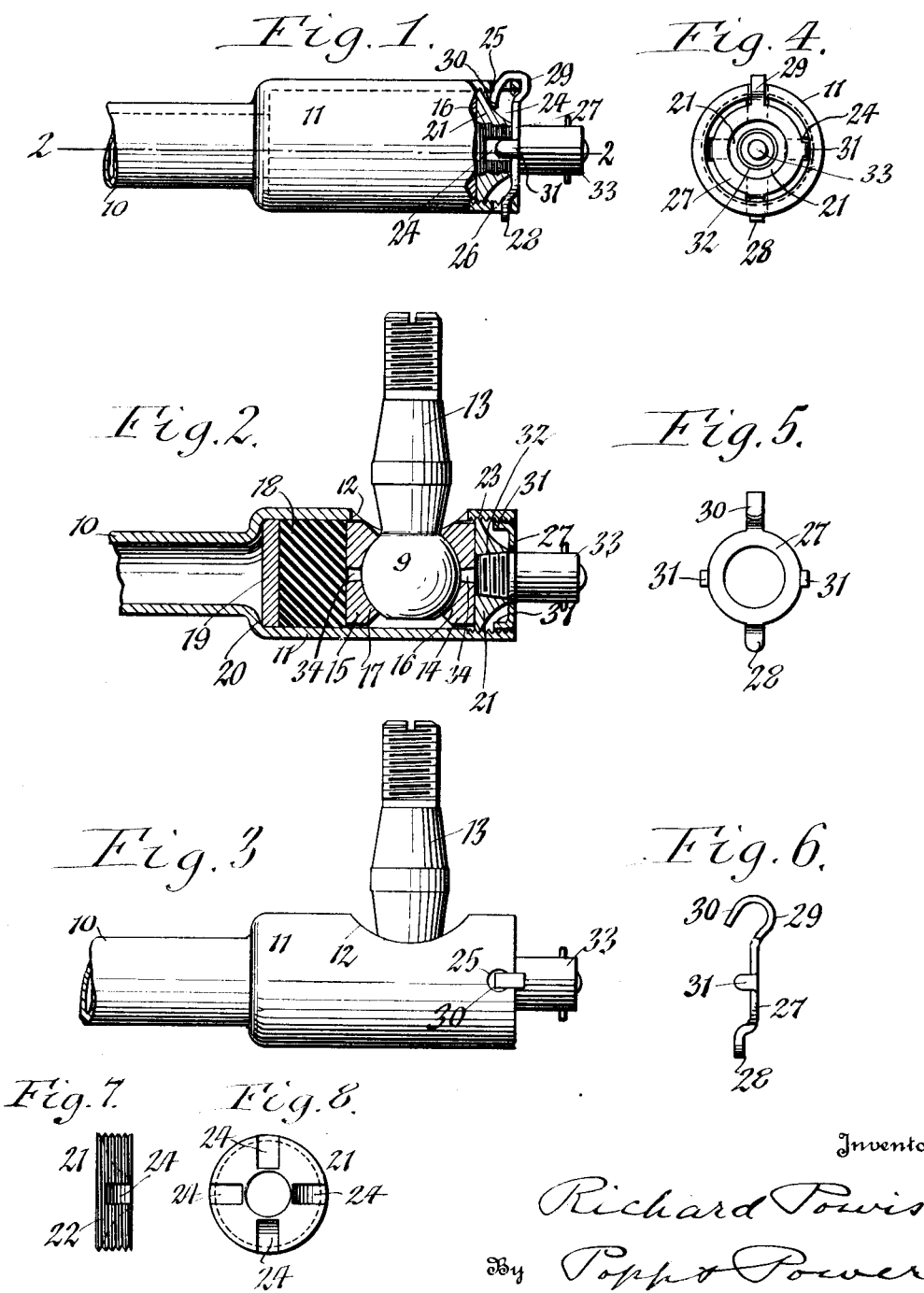

1,881,935

UNITED STATES PATENT OFFICE

RICHARD POWIS, OF BUFFALO, NEW YORK, ASSIGNOR TO HOUDE ENGINEERING CORPORATION, OF BUFFALO, NEW YORK, A CORPORATION OF NEW YORK

LOCKING KEY

Application filed January 19, 1931. Serial No. 509,669.

This invention relates to a locking key or clip which is adapted to serve as a substitute in many instances for the ordinary cotter pin or split key heretofore in common use for preventing relative movement of parts or for preventing different parts from becoming detached.

It has been found that when ordinary cotter pins are used on the drag links of shock absorbers on automobiles which are arranged quite close to the roadway, these cotter pins frequently become broken or worn by abrasion due to the cotter pin being acted upon by flying rocks and similar hard objects encountered on the roadway, thereby rendering it liable for the parts previously held in place by such cotter pins to become detached and endanger the users of the automobile.

One of the objects of this invention is to provide a locking key which is capable of general use but more particularly for use either on the drag links or other parts associated with the shock absorbers of automobiles, which locking key when in its operative position on the respective part of the drag link or shock absorber will not only reliably hold the parts in their proper relative position against displacement but also will project a minimum extent from the part on which the same is mounted and thereby be least liable to wear or breakage by the action of flying stones, grit or the like which may be encountered on the roadway.

A further object of this invention is to provide a locking key of this character which can be produced at low cost and very quickly applied to and removed from the parts which are to be held thereby, thus effecting a substantial economy in manufacture and also reducing the amount of labor involved in asasembling or dismembering the particular unit in connection with which the same is used.

In the accompanying drawing:

Figure 1 is a side elevation, partly in section, showing the preferred embodiment of my invention used in connection with the drag link of a shock absorber.

Figure 2 is a horizontal section of the same taken on line 2—2 Fig. 1.

Figure 3 is a top plan view thereof.

Figure 4 is an end view of the assembly shown in Fig. 1.

Figure 5 is a front elevation of the locking key detached from the parts with which the same is intended to be used.

Figure 6 is a side elevation of the same.

Figure 7 is a front elevation of the assembling screw nut which is arranged in the outer end of the tubular drag link and adapted to cooperate with the locking key of the present invention.

Figure 8 is a side elevation of said assembling screw nut.

In the following description similar reference characters indicate like parts in the several figures of the drawing:

Although this locking key may be constructed in various forms in order to better adapt the same for some particular use or installation, the same in the present case is so designed that it may be used effectively in connection with the coupling or ball and socket joint between the drag link of a shock absorber and the part with which the drag link is to be connected.

These parts of the shock absorber, as shown in the drawing, are constructed as follows:

The numeral 10 represents a portion of a hollow or tubular drag link one end of which it will be assumed is connected with one of the relatively movable members of the automobile between which the shock absorber is interposed, for example, the axle of the car which carries the supporting wheels and is yieldingly connected with the frame by an interposed spring system. The other end of the drag link is provided with a tubular head 11 which is open at its front end and provided on one side with a laterally extending opening 12. A neck 13 projects laterally through this opening 12 and is connected at its inner end with the tubular head 11 by means of a ball and socket joint, while its outer end is adapted to be connected with the operating rock arm or similar member of a shock absorber, the body of which is mounted on the frame of the car which moves vertically relatively to the axle of the car.

The ball and socket joint in the present case comprises a ball 9 formed on the inner end of the neck 13 and arranged within the tubular head 11 of the drag link. The front and rear sides of this ball are engaged by bearing disks 14, 15 which are provided on their opposed sides with spherical surfaces 16, 17 respectively for engagement with the front and rear sides of the ball 9, as shown in Fig. 2.

The inner bearing disk 15 is preferably yieldingly supported on its inner side by engaging the same with a yielding cushion consisting preferably of a rubber block 18 which is arranged within the inner or rear part of the tubular head 11 and engages its front end with the rear side of the bearing disk 15, while its rear end engages with a supporting disk 19 resting at its periphery against an internal shoulder 20 which is formed between the opposing ends of the contracted link 10 and the enlarged head 11 thereof.

The front bearing disk 14 is supported on its outer or front side by engagement therewith of an assembling screw nut 21 which is provided with an external screw thread 22 engaging with an internal thread 23 formed in the front or outer part of the bore of the tubular head 11, whereby upon turning the assembling screw nut in the direction for moving the same into the linkhead 11, this nut will engage the front bearing disk 14 and hold the several parts of the ball and socket joint properly in their assembled position.

For the purpose of enabling the assembling screw nut to be readily turned for screwing the same into or out of the tubular head 11 the front or outer end of this assembling screw nut is provided with a plurality of notches 24 at the front peripheral end thereof, which notches are preferably four in number and distributed equidistant around the periphery of this nut, as shown in Figs. 1, 2, 4, 7 and 8. These notches are adapted to receive a wrench of suitable construction whereby the nut may be turned for assembling or dismembering the same with the head 11 and also engaging and disengaging the same from the front bearing disk 14.

On diametrically opposite sides the tubular head of the drag link is provided adjacent to its outer or front end with upper and lower openings 25, 26.

Heretofore these openings have received an ordinary cotter pin or similar device which was passed transversely through these openings and through the slots on the outer end of an ordinary slotted, notched or castellated screw nut for the purpose of preventing the latter from becoming detached from the head of the drag link. In the present case, however, the cotter pin or like device is replaced by a locking key or clip embodying the present invention, which key or pin in its preferred embodiment is constructed and assembled with the ball and socket joint of the shock absorber above described as follows:

The numeral 27 represents the body of the locking key which preferably has the form of a circle or ring. On the lower edge of this ring-shaped body is arranged a lower locking and supporting lug 28 which is deflected forwardly or inwardly from the body of the key and has its extremity projecting radially therefrom and arranged in a plane parallel with the plane of the body, as best shown in Figs. 1, 5 and 6. On its upper edge the body is provided with a hook, the back 29 of which projects forwardly and laterally from the body, while the beak or bill 30 of the hook projects forwardly from the back 29 beyond the iner or front side of the body and also projects inwardly toward the axis of the body, this hook in general being curved in the form of a semi-circle.

On its diametrically opposite side edges the body is provided with two locking lugs 31, each of which projects forwardly or inwardly from the body and is arranged lengthwise or parallel with the axis of the same. This locking key is preferably constructed integrally by stamping the same out of sheet metal into the desired form, but if desired the same may be of any other suitable material and form in order to best adapt the same for the particular installation in connection with which the same is to be used.

In applying this locking key to the ball and socket joint of the coupling between the drag link and the ball and socket joint of the shock absorber drag link above described, the lower locking lug 28 is first slipped into the lower opening 26 of the tubular head 11 from the inner side of the latter and the beak or bill 30 of the hook at the upper end of the body is introduced into the upper opening 25 of the said head from the outer side of the latter, during which operation the body of the locking key is engaged with the outer or front end of the assembling screw nut 21, the lower locking lug 28 and the beak of the hook are engaged with the upper and lower notches 24 of the assembling nut, and the side lugs 31 of the later are engaged with the side notches 24 of the locking nut, as shown in Figs. 1, 2 and 4.

After the parts have been thus assembled the operator by means of a hammer or other suitable tool, strikes one or more blows against the outer side of the hook so as to cause the latter to curl and pass with its curved beak inwardly through the opening 25 in the head and thereafter engage the beak with the relatively inclined surface at the bottom of the uppermost notch 24 in the screw nut 21, thereby further curling the beak and causing the same to be interlocked with the nut and the wall of the head, as shown in Fig. 1.

While the beak of the hook at the upper end of the body of the locking key engages with the upper notch of the assembling screw nut, the lower and side lugs of the key engage respectively with the lower and side notches of the assembling nut, thereby holding the latter positively against accidental unscrewing and preventing disassembling of the parts.

When the locking key is mounted on the tubular head of the drag link in the manner shown and described the least possible parts of this key projecting beyond or exposed on the exterior of this head so that liability of wearing any parts of this locking key by abrasion due to engagement therewith of flying rocks or other material encountered on the roadway is reduced to a minimum, and it therefore follows that there is little liability of the locking key being injured in a manner which would permit its release from the tubular head and ultimately disarrange the parts of the ball and socket joint between the drag link and the mechanism of the shock absorber to such an extent as to become dangerous.

Moreover, this locking key can be very quickly, easily and conveniently applied to and removed from the tubular head, thereby effecting a substantial saving in time and labor involved in this work as compared with the means heretofore employed for accomplishing the same purpose.

Although this locking key is larger in area than cotter pins heretofore in use for a similar purpose the cost of the same is less due to the fact that the same can be very economically stamped out of sheet metal and can also be more rapidly assembled and dismembered in connection with the parts with which it is used.

Lubrication of the co-operating spherical surfaces of the ball 9 and the bearing disks 14, 15 is effected by providing the center of the assembling screw nut 21 with a threaded opening 32 in which is secured a lubricator 33 of any suitable construction from which the lubricant is conducted to the spherical bearing surfaces through a central opening 34 in the adjacent bearing disk 14. Both bearing disks 14 and 15 are provided with such openings 34 so that either one will conduct lubricant to the bearing surfaces and thus avoids the necessity of selecting any particular bearing disk for this purpose.

It is possible to apply the lubricator to the outer bearing disk in this manner without interfering with the locking key inasmuch as the body 27 of the latter is of ring shape and therefore permits of passing the lubricator through the central opening in this body and connecting the same with the assembling screw nut.

I claim as my invention:

1. A locking key adapted to be applied to a tube having openings on diametrically opposite sides of an end thereof, comprising a ring shaped body, a lug on the lower side of said body, a hook on the upper side of said body, and two side lugs arranged on opposite sides of said body at right angles to said hook, said body being adapted to enter said tube and extend across the same, said lower lug being off-set inwardly from said body and adapted to enter one of said openings from the inner side of said tube, said hook having its back off-set outwardly from said body and its beak projecting inwardly and adapted to enter the other opening from the outer side of the tube, and said side lugs projecting inwardly from said body and adapted to extend along the inner side of said tube, said lower and side lugs and the beak of said hook being adapted to engage notches arranged circumferentially equidistant on an end of a screw nut secured in said head.

2. A locking key adapted to be applied to a tube having openings on diametrically opposite sides thereof and having a circumferentially notched plug threaded into said end, comprising a ring-shaped body having an inwardly offset lug and an outwardly offset inwardly curled lug, said lugs being adapted to enter the openings in said tube when said key is placed within said tube against said plug, the inwardly projecting lug being so proportioned as to enter the opening through a notch in said plug from the inside of said tube, and the outwardly projecting lug being adapted to be curled over the end of said tube and through the opposite opening into one of the notches in said plug.

3. A locking key adapted to be applied to a tube having openings on diametrically opposite sides thereof and having a circumferentially notched plug threaded into said end, comprising a ring shaped body having an inwardly offset lug and an outwardly offset inwardly curled lug, said lugs being adapted to enter the openings in said tube when said key is placed within said tube against said plug, the inwardly projecting lug being so proportioned as to enter the opening through a notch in said plug from the inside of said tube, the outwardly projecting lug being adapted to be curled over the end of said tube and through the opposite opening into one of the notches in said plug, and said ring shaped body having a plurality of lugs adapted to be engaged with the notches on the plug.

4. In combination with a tube having openings on diametrically opposite sides of an end thereof and a plug threaded in said tube past the end thereof, a locking key having a ring shaped body with an inwardly offset lug and an outwardly offset inwardly curled lug, said lugs entering said openings when said key is within said tube against said plug, the inwardly projecting lug entering the opening from the inside of said tube and the outwardly projecting lug from the outside of said tube.

5. In combination with a tube having openings on diametrically opposite sides of an end thereof and a plug, having a plurality of notches spaced about the periphery thereof, threaded into said tube past the end thereof, a locking key having a ring shaped body with an inwardly curled lug and an outwardly curled lug, said lugs entering said openings when said key is within said tube against said plug, said inwardly projecting lug passing through one of the notches in said plug and entering the opening from the inside of said tube and said outwardly projecting lug being curled about the end of the tube and passing through the other opening and into a notch in said plug.

6. In combination with a tube having openings on diametrically opposite sides of an end thereof and a plug having a plurality of notches spaced about the periphery thereof threaded into said tube past the end thereof, a locking key having a ring shaped body with an inwardly offset lug and outwardly offset inwardly curled lug, said lugs entering said openings when said key is within said tube against said plug, said inwardly projecting lug passing through one of said notches in said plug and entering the opening from the inside of said tube, said outwardly projecting lug being curled into the opposite opening in the tube from the outside thereof and entering one of said notches in said plug, said key having a plurality of smaller lugs pressed into the remaining notches on the plug.

7. In combination with a tube having openings on diametrically opposite sides of an end thereof and a plug having a threaded central opening for receiving a lubricator and having radially extending arcuate notches about the periphery thereof, threaded into said tube past the end thereof, a locking key having a ring shaped body for encircling the lubricator and provided with an inwardly offset lug and an outwardly offset inwardly curled lug, said lugs entering said openings when said key is within said tube against said plug, said inwardly projecting lug passing through one of said notches in said plug and entering the opening from the inside of said tube, said outwardly projecting lug being curled into the opposite opening in the tube from the outside thereof and entering one of said notches in said plug and said key having a plurality of smaller lugs pressed into the remaining notches on the plug.

In testimony whereof I hereby affix my signature.

RICHARD POWIS.